Patented July 22, 1952

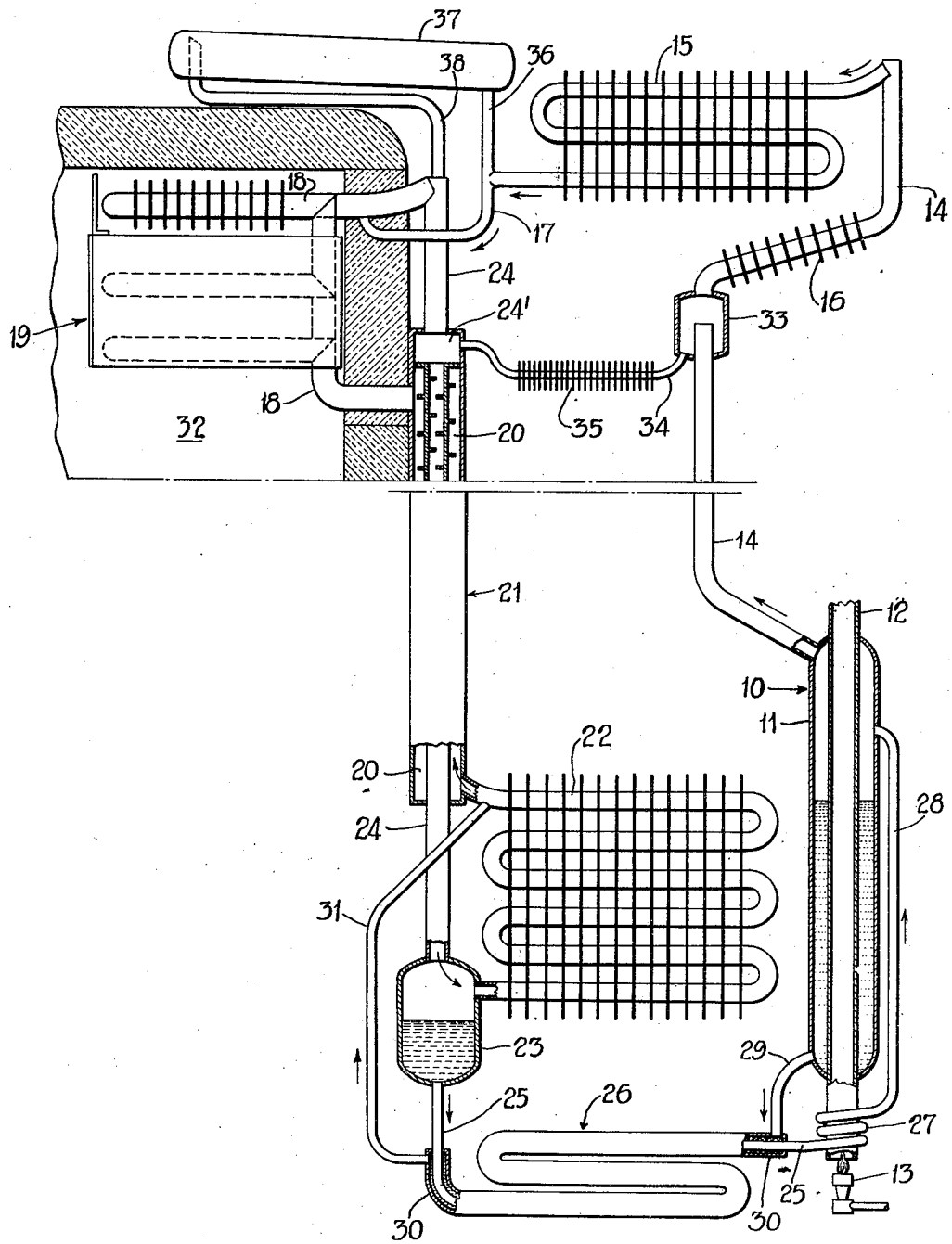

2,603,955

UNITED STATES PATENT OFFICE 2,603,955

MEANS FOR AND METHOD OF CIRCULATING INERT GAS IN A REFRIGERATING SYSTEM

Carl T. Ashby and Charles A. Miller, Evansville, Ind., assignors to Servel, Inc., New York, N. Y., a corporation of Delaware Application April 14, 1948, Serial No. 21,044

6 Claims. (Cl. 62—119.5)

Our invention relates to refrigeration, and more particularly to gravity circulation of an inert pressure-equalizing gas in a three-fluid absorption refrigeration system.

This application relates back for common subject matter to, and is filed as a continuation-in-part of, our copending, but now abandoned application Serial No. 559,367, filed October 19, 1944.

In a gravity flow absorption refrigeration system of the three-fluid type; that is, a system charged with a refrigerant such as ammonia, an absorbent such as water and a pressure-equalizing gas such as hydrogen, and wherein the pressure-equalizing gas circulates by gravity between the evaporator and the absorber, it is necessary to insure that the flow of pressure-equalizing gas be started in the proper direction. The circulation of the pressure-equalizing gas in such a system is caused by the fact that there are two columns of gas of unequal weight between the evaporator and absorber. One column contains hydrogen weak in ammonia and is relatively light; the other column contains hydrogen rich in ammonia and is relatively heavy. The heavy column over-balances the light column which causes the rich gas to flow downward from the evaporator toward the absorber and the weak gas to flow upward from the absorber toward the evaporator.

When such a system is first charged with a pressure-equalizing gas, or after such a system has been standing idle for an appreciable time, the evaporator, absorber and interconnected conduits forming the gas circuit all contain a gas of substantially the same composition. Therefore, when such a system is put into operation, the gas will circulate in one direction or another depending upon which side of the gas circuit is first weighted with refrigerant, in other words, upon which of the two gas columns first receives a rich gas and over-balances the other column which contains weak gas.

It has been proposed heretofore to initiate the circulation of inert gas by vaporizing, in the gas circuit, a portion of the liquid ammonia en route from the condenser to the evaporator before such refrigerant reaches the evaporator proper. Such an arrangement is satisfactory under most conditions of operation. The liquid ammonia so vaporized is useful not only in initiating the circulation of inert gas in the proper direction, it is also useful in that it precools the remainder of the liquid ammonia before such liquid reaches the evaporator.

In refrigerating systems of the above type a conduit is provided for conveying refrigerant vapor from the generator to the upper or inlet end of the condenser. This conduit, which acts as a rectifier, may be simply a straight pipe that connects the vapor outlet of the generator to the vapor inlet of the condenser, or, in some instances, this conduit may be increased in length by providing offset portions therein, which offset portions may or may not be provided with heat transfer fins depending upon the location of the conduit and the manner in which the conduit is cooled. In any event, rectification of the ammonia vapor takes place in substantially the entire length of this conduit. In the rectifier conduit some ammonia vapor condenses along with the water vapor. The proportion of liquid ammonia to water in the rectifier condensate increases along the length of the rectifier with the result that the condensate formed in the upper part of the rectifier contains a relatively high amount of liquid ammonia.

In accordance with our invention, a trap is provided in an upper portion of the rectifier conduit and condensate that forms above the trap drains into the latter. The condensate collected in the trap is conveyed to a portion of the gas circuit, preferably to the upper portion of the gas heat exchanger, wherein inert gas rich in refrigerant is intended to flow downward. However, as stated above, when the system is first charged with a pressure-equalizing gas, or after the system has been standing idle for an appreciable time, the entire gas circuit contains a gas of substantially the same composition, which gas is hydrogen relatively weak in ammonia. Therefore, upon starting the system the liquid ammonia contained in the rectifier condensate that is conveyed from the rectifier trap to the upper portion of the gas heat exchanger, evaporates and diffuses into the relatively weak gas with the result that the gas is loaded with heavy ammonia vapor and the heavy gas flows downward through the gas heat exchanger.

It will be noted that in accordance with our invention, gas circulation is initiated in a desired direction by the vaporization of rectifier condensate in the gas circuit even before ammonia vapor is delivered to the condenser. Therefore, by the time ammonia vapor has been liquefied in the condenser and delivered therefrom to the evaporator, the circulation of gas will have been firmly established and the liquid ammonia vaporizes and diffuses into the circulating gas in the evaporator without disturbing the circulation of such gas. On the other hand, as has been proposed heretofore, where the circulation of gas is initiated by the vaporization of a portion of the liquid ammonia en route from the condenser to the evaporator, such circulation is started only a few seconds before liquid ammonia is delivered to the evaporator. In which case, liquid ammonia is apt to reach the evaporator and oppose the circulation of gas before circulation thereof has been firmly established.

The above and other objects and advantages of our invention will become more apparent when considered in connection with the following description and accompanying drawing, wherein the single figure diagrammatically illustrates one embodiment of our invention.

Referring now to the drawing, our improved refrigerating system includes a generator 10 having an outer shell 11 through which extends a flue 12 which is arranged to be heated in any suitable manner, as for instance, by a gas burner 13. A conduit 14 extends from the upper part of the generator to the upper or inlet end of a condenser 15. Conduit 14 comprises an air cooled rectifier. Fins 16 are added to conduit 14 only if the design is such that the conduit is not long enough or cooled enough to provide the desired rectification at usual room temperatures. The lower or outlet end of condenser 15 is connected by a conduit 17 with the upper end of a pipe coil 18 of the cooling unit or evaporator 19. The lower end of coil 18 is connected to the upper end of an outer space 20 of a gas heat exchanger 21. The evaporator 19 is disposed within a refrigerator cabinet 32. The outlet end of condenser 15 is connected also by a conduit 36, pressure vessel 37 and a conduit 38 to an inner conduit 24 of the gas heat exchanger. Refrigerant vapor not liquefied in the condenser flows through conduit 36 to displace inert pressure-equalizing gas in pressure vessel 37 and force said gas through conduit 38 into the gas circuit, thereby increasing the total pressure in the entire system to insure condensation of refrigerant vapor in condenser 15.

The upper end of an absorber coil 22 is connected to the outer space 20 of the gas heat exchanger, while the lower end of coil 22 communicates with the upper part of a vessel 23. Inner conduit 24 of the gas heat exchanger extends from the upper end of vessel 23 through the heat exchanger and communicates with the upper end of evaporator coil 18. Conduit 24 is provided with an enlarged portion 24' which forms the upper end of gas heat exchanger 21. A conduit 25 extends from the lower part of vessel 23 through a liquid heat exchanger 26 and communicates with the lower end of a coil 27 which is in heat exchange relation with generator flue 12. The upper end of this coil is connected by a conduit 28 with the upper end of the generator. A conduit 29 connects the lower part of the generator with the outer passage 30 of liquid heat exchanger 26, while a conduit 31 connects the other end of passage 30 with the upper part of absorber coil 22.

In accordance with our invention, a trap or vessel 33 is located in an upper portion of rectifier conduit 14 and is adapted to receive condensate from the upper portion of said rectifier conduit. A conduit 34 provided with heat transfer fins 35 extends from the lower portion of vessel 33 and opens into the enlarged portion 24' of gas heat exchanger 21.

The operation of the above-described system is as follows: The system is charged with a solution of refrigerant, such as ammonia, dissolved in an absorbent such as water, and with an inert pressure-equalizing gas such as hydrogen. The application of heat to the solution in the generator causes expulsion of refrigerant vapor therefrom, which vapor flows through conduit 14 to the upper end of condenser 15. Some water vapor is also expelled along with this refrigerant vapor. However, the water vapor and part of the refrigerant vapor expelled from the generator are condensed in the rectifier pipe 14 and rectifier condensate formed above vessel 33 drains into the latter and is conveyed by conduit 34 into the enlarged portion 24' of the gas heat exchanger 21. In other words, when the system is first started, condensate rich in liquid refrigerant is conveyed into the gas heat exchanger. The liquid refrigerant vaporizes and diffuses into the weak pressure-equalizing gas contained in the gas heat exchanger with the result that the weight of the gas is increased which initiates the circulation of the pressure-equalizing gas downward through the inner passage 24 of the gas heat exchanger, upward through absorber 22, upward through the outer passage 20 of the gas heat exchanger, into the lower portion of evaporator coil 18, upward through said coil and then downward through connection 24 completing the gas circuit. Thus the circulation of pressure-equalizing gas is started in the desired direction through the gas circuit before any liquid refrigerant reaches the evaporator.

The rectified ammonia vapor flows from the upper end of conduit 14 into the condenser 15 wherein the vapor is liquefied and the liquid ammonia flows through conduit 17 to the upper end of pipe coil 18 of the evaporator. Inert gas weak in refrigerant, as previously explained, flows into the lower end of coil 18 from the outer space 20 of heat exchanger 21. The liquid and gas flow in counter-current relation in coil 18 and the liquid evaporates and diffuses into the gas with consequent absorption of heat from the cooling unit and its surroundings. The rich gas mixture of the refrigerant and inert gas formed in evaporator coil 18 flows out through the upper end of said coil into conduit 24 of the gas heat exchanger, from whence it passes through the upper part of vessel 23 to the lower end of absorber 22. In the absorber the rich gas mixture is brought into intimate contact with absorption liquid weak in refrigerant which is introduced into the upper part of the absorber through conduit 31. The absorption liquid absorbs refrigerant from the inert gas and the latter flows from the absorber through space 20 of gas heat exchanger 21 to the lower end of evaporator coil 18. The rich absorption solution formed in absorber 22 flows therefrom into vessel 23 and thence through the conduit 25 to the lower end of coil 27. The application of heat to this coil raises liquid through conduit 28 by vapor-lift action to the upper part of generator 10. Within the generator further heat is supplied to the solution which results in expulsion of refrigerant vapor from solution, as previously explained. Absorption solution weak in refrigerant flows by gravity through conduits 29, 30 and 31 to the upper part of the absorber coil.

After the system has been in operation for a time, the pressure-equalizing gas leaving the upper portion of the evaporator and flowing downward through the inner passage 24 of the gas heat exchanger will be relatively rich in ammonia vapor, and the condensate conveyed from vessel 33 through conduit 34 into the upper portion of the gas heat exchanger will have a lower partial pressure of ammonia than when the system is first started. If the partial pressures are so related that evaporation does not occur, the condensate will be delivered as such into the vessel 23. If these two partial pressures are so related that evaporation occurs in the gas heat exchanger, the refrigerating effect of this evaporation will be useful because it cools the weak inert gas flowing from the absorber through the outer space of the gas heat exchanger to the evaporator.

While we have illustrated and described but one specific form of our invention, it is to be understood that our invention may take other forms. Therefore, our invention is to be limited only by the following claims.

What is claimed is:

1. A refrigerating system including a generator, a rectifier, a condenser, an evaporator and an absorber, a first circuit including said generator, rectifier, condenser, evaporator and absorber for flow of a refrigerating medium therethrough, a second circuit including said evaporator and absorber for gravity flow of an inert pressure-equalizing medium therethrough in counter-flow relation with said refrigerating medium, a third circuit including said generator and said absorber for flow of an absorption medium therethrough, a connection between said first and second circuits for flow of refrigerant-absorbent solution from the rectifier to a portion of said second circuit leading from the evaporator to the absorber to initiate the flow of pressure-equalizing medium through said second circuit in a predetermined direction, and means in said inert gas circuit between the evaporator and the absorber to cause inert gas flowing from the evaporator to the absorber to be weighted by the refrigerant-absorbent solution flowing into said inert gas circuit.

2. In an absorption refrigerating system of the uniform pressure type, a refrigerant circuit including a generator, a rectifier, a condenser, an evaporator and an absorber, an inert gas circuit including said evaporator, a gas heat exchanger and said absorber, a solution circuit including said generator and said absorber, and a conduit connecting said rectifier to a portion of said inert gas circuit between the evaporator and the gas heat exchanger through which inert gas flows from the evaporator to the absorber, the construction and arrangement of said inert gas circuit and said connecting conduit being such that refrigerant-absorption solution flows from the rectifier into the inert gas circuit so as to initiate flow of inert gas between the evaporator and the absorber in a predetermined direction.

3. In an absorption refrigerating system, a generator, a rectifier, a condenser, an evaporator, a gas heat exchanger and an absorber interconnected by conduits to form a complete circuit, and an additional conduit connected between said rectifier and said gas heat exchanger for flow of refrigerant-absorbent solution from said rectifier into said gas heat exchanger.

4. In the art of refrigeration with a system in which refrigerant fluid is separated from absorption liquid by vaporization and rectification and in which inert gas is circulated by gravity in counter-flow relation to the refrigerant fluid, the improvement which includes initiating a circulation of inert gas in the system by introducing rectifier condensate into a portion of the system which normally contains inert gas rich in refrigerant to thereby weight such inert gas and cause circulation thereof in a predetermined direction, and thereafter introducing refrigerant fluid into the circulated inert gas for evaporation and diffusion into the gas.

5. A method of refrigeration which includes expelling a refrigerant vapor out of a refrigerant-absorbent solution, rectifying the refrigerant vapor, initiating circulation of a pressure-equalizing gas in a pressure-equalizing gas circuit in counter-flow relation to subsequent flow of a refrigerant fluid in said circuit by flowing at least a part of the condensate resulting from the rectification of the refrigerant vapor into the pressure-equalizing gas circuit between a place of evaporation and a place of absorption, subsequently liquefying the rectified refrigerant vapor, evaporating the liquid refrigerant into the circulating pressure-equalizing gas, and absorbing the evaporated refrigerant back into the absorbent solution.

6. A method of refrigeration which includes expelling refrigerant vapor from a refrigerant-absorbent solution, flowing the expelled vapor to a place of liquefaction, condensing a portion of the expelled vapor en route to the place of liquefaction whereby the vapor is rectified, initiating circulation of inert gas in an inert gas circuit in counter-flow relation to subsequent flow of liquid refrigerant in said circuit by flowing the condensate produced by the rectification of the vapor into contact with the inert gas to cause evaporation of the condensate into the inert gas whereby the inert gas is weighted and flows downward in one side of the gas circuit, subsequently condensing the rectified vapor to liquid in the place of liquefaction, and flowing the liquid into the circulated inert gas in counter-flow relation thereto to cause evaporation of the liquid.

CARL T. ASHBY.
CHARLES A. MILLER.

REFERENCES CITED

The following references are of record in the file of this patent:

UNITED STATES PATENTS

| Number | Name | Date |
| --- | --- | --- |
| 2,229,687 | Thomas | Jan. 28, 1941 |
| 2,278,661 | Lenning et al. | Apr. 7, 1942 |
| 2,315,356 | Siedle | Mar. 30, 1943 |
| 2,463,409 | Moody | Mar. 1, 1949 |
| 2,484,669 | Backstrom | Oct. 11, 1949 |